(12) United States Patent
Huang

(10) Patent No.: US 8,072,342 B2
(45) Date of Patent: Dec. 6, 2011

(54) OVERCURRENT PROTECTION CIRCUIT

(75) Inventor: Yong-Zhao Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 326 days.

(21) Appl. No.: 12/560,448

(22) Filed: Sep. 16, 2009

(65) Prior Publication Data
US 2011/0057808 A1    Mar. 10, 2011

(51) Int. Cl.
*G08B 21/00* (2006.01)

(52) U.S. Cl. ........ 340/664; 340/665; 340/331; 340/604; 340/605; 340/691.8; 361/91.3; 361/101; 324/424

(58) Field of Classification Search .......... 340/664, 340/665, 331, 604, 605, 691.8; 361/91.3; 361/101; 324/424
See application file for complete search history.

(56) References Cited

U.S. PATENT DOCUMENTS

| 4,680,664 | A  | * | 7/1987 | Leuthen ................ 361/91.3 |
| 6,788,128 | B2 | * | 9/2004 | Tsuchida ................ 327/427 |
| 2010/0156324 | A1 | * | 6/2010 | Nagase et al. ............ 315/307 |

* cited by examiner

*Primary Examiner* — Tai T Nguyen
(74) *Attorney, Agent, or Firm* — Altis Law Group, Inc.

(57) ABSTRACT

An overcurrent protection circuit connected between a voltage input and a voltage output of an electronic device to protect against excessive current is disclosed. The overcurrent protection circuit includes first to fifth resistors, a relay comprising a coil and a normally closed switch, a pnp transistor, and a break-over element. When a current between the voltage input and the voltage output is greater or equal to a rated current of the electronic device, the npn transistor is turned on, while the coil is powered on to control the switch to be opened, therefore the voltage output cannot output voltage, which can protect against excessive current damaging the electronic device.

7 Claims, 4 Drawing Sheets

OVERCURRENT PROTECTION CIRCUIT

BACKGROUND

1. Technical Field

The present disclosure relates to circuits and, particularly, to an overcurrent protection circuit.

2. Description of Related Art

Many electronic devices include fuses used to protect against excessive current damaging the electronic devices. However, the fuses are often not adequately sensitive, and furthermore, users have to replace with new fuses when the fuses are burnt out, which is very inconvenient.

DETAILED DESCRIPTION

Figure 1:
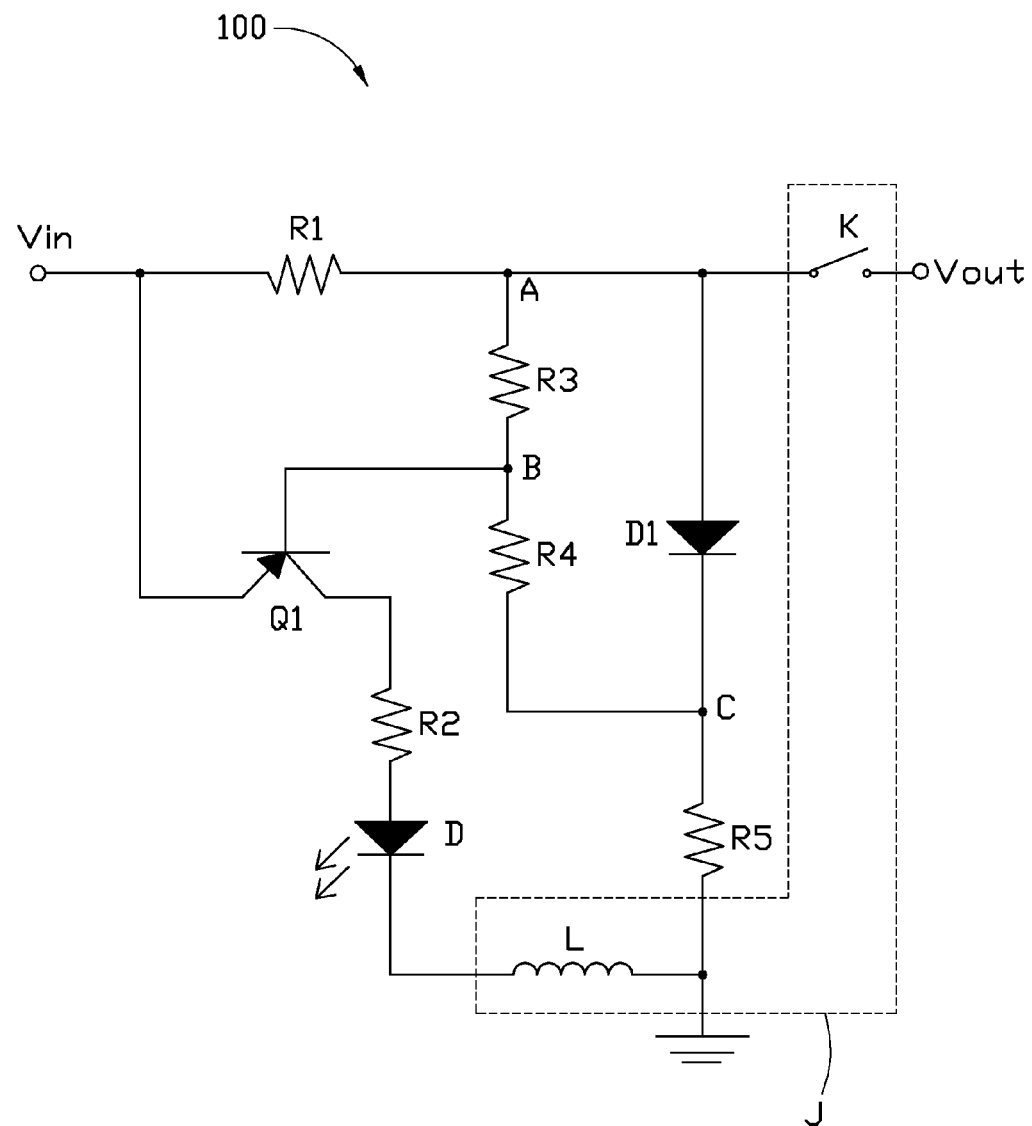
FIG. 1 is a circuit diagram of a first exemplary embodiment of an overcurrent protection circuit.

Referring to FIG. 1, a first exemplary embodiment of an overcurrent protection circuit 100 is connected between a voltage input Vin and a voltage output Vout of an electronic device, to protect against excessive current between the voltage input Vin and the voltage output Vout. The overcurrent protection circuit 100 includes a pnp transistor Q1, a light-emitting diode (LED) D, a diode D1, a relay J, and five resistors R1-R5. The relay J includes a coil L and a normally closed switch K. When the coil L is powered on, the switch is opened.

The resistor R1 is connected between the voltage input Vin and a first terminal of the switch K. A second terminal of the switch K is connected to the voltage output Vout. An emitter of the transistor Q1 is connected to the voltage input Vin. A collector of the transistor Q1 is connected to an anode of the LED D via the resistor R2. A cathode of the LED is grounded via the coil L. A series circuit including the resistors R3-R5 connected in series is connected between the first terminal of the switch K and ground. A base of the transistor Q1 is connected to a node B between the resistor R3 and the resistor R4. An anode of the diode D1 is connected to the first terminal of the switch K. A cathode of the diode D1 is connected to a node C between the resistor R4 and the resistor R5.

There has a formula: Va=Vin−R1*Iout, where Va is a voltage of a node A between the resistor R1 and the resistor R3, Vin is a voltage of the voltage input Vin, R1 is a resistance of the resistor R1, and Iout is a current between the voltage input Vin and the voltage output Vout. A voltage Vc of the node C can be calculated as Vc=Va−Vd1=Vin−R1*Iout−Vd1, wherein Vd1 is a break-over voltage of the diode D1. A voltage Vb of the node B can be calculated as Vb=Vc+Vd1*R4/(R3+R4)=Vin−R1*Iout−Vd1+Vd1*R4/(R3+R4), wherein R3 is a resistance of the resistor R3, R4 is a resistance of the resistor R4. A voltage difference Veb between the emitter and the base of the transistor Q1 can be calculated as a formula (1) which is Veb=Vin−Vb=Vin−[Vin−R1*Iout−Vd1+Vd1*R4/(R3+R4)]=R1*Iout+Vd1−Vd1*R4/(R3+R4). In the above formula, Vd1−Vd1*R4/(R3+R4) is a fixed value, namely the voltage difference Veb is proportional to the current Iout. When the voltage difference Veb reaches to a break-over voltage of the transistor Q1, the transistor Q1 is turned on, the LED D is turned on to light up, and the coil L is powered on to control the switch K to be opened, therefore the voltage output Vout cannot output voltage.

When the overcurrent protection circuit 100 is used in the electronic device, the current Iout at the time of the transistor Q1 being turned on is predetermined equaling to a rated current of the electronic device via adjusting element parameters of the overcurrent protection circuit 100 according to the formula (1). Therefore, when the current Iout is greater or equal to the rated current of the electronic device, the transistor Q1 is turned on, the LED D is turned on to light up, and the coil L is powered on to control the switch K to be opened, therefore the voltage output Vout cannot output voltage, which can protect against excessive current damaging the electronic device. When the current Iout is less than the rated current of the electronic device again, the transistor Q1 is turned off, the LED D is turned off, and the coil L is powered off, the switch K is closed again, therefore the voltage output Vout can continue to output voltage, which is very convenient.

Figure 2:
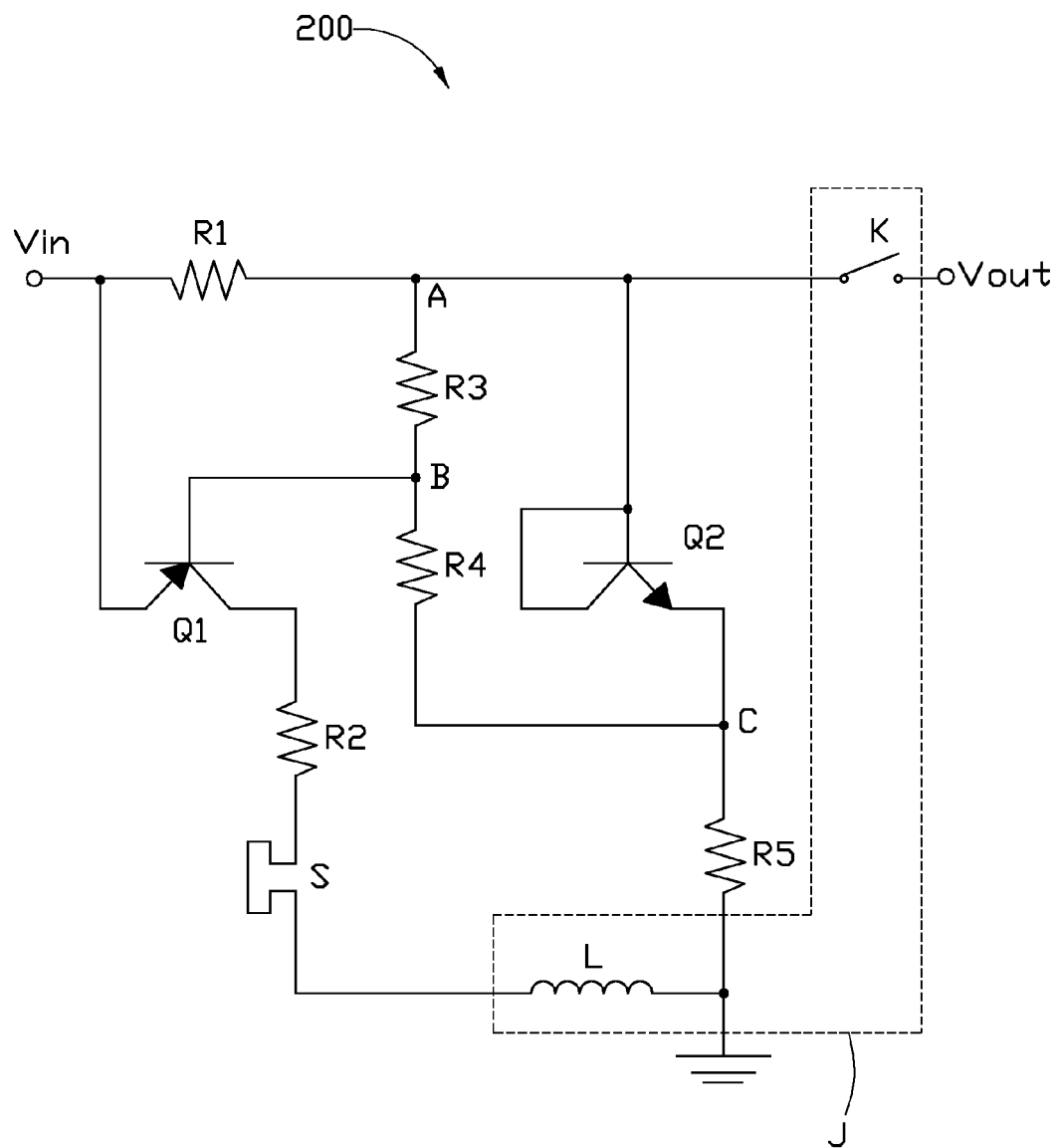
FIG. 2 is a circuit diagram of a second exemplary embodiment of an overcurrent protection circuit.

Referring to FIG. 2, a second exemplary embodiment of an overcurrent protection circuit 200 is shown. The overcurrent protection circuit 200 is similar to the overcurrent protection circuit 100, except that in place of the diode D1 an npn transistor Q2 is provided, and in place of the LED D a buzzer S is provided. In this embodiment, a base of the transistor Q2 is connected to the first terminal of the switch K and a collector of the transistor Q2. An emitter of the transistor Q2 is connected to the node C between the resistor R4 and the resistor R5. The buzzer S is connected between the resistor R2 and the coil L. The working process of the overcurrent protection circuit 200 is similar to the working process of the overcurrent protection circuit 100, therefore the working process of the overcurrent protection circuit 200 is not described here.

Figure 3:
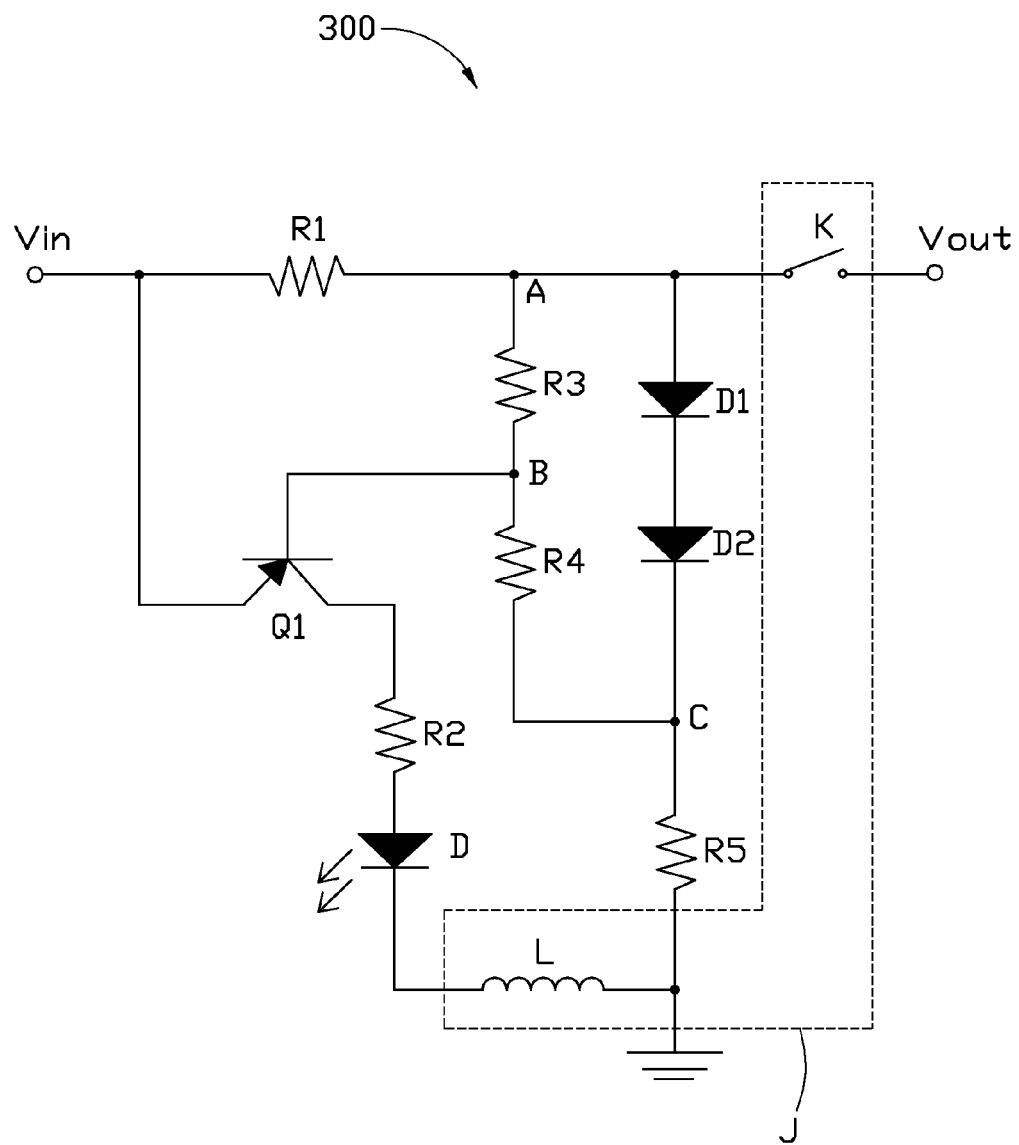
FIG. 3 is a circuit diagram of a third exemplary embodiment of an overcurrent protection circuit.

Referring to FIG. 3, a third exemplary embodiment of an overcurrent protection circuit 300 is shown. The overcurrent protection circuit 300 is similar to the overcurrent protection circuit 100, except that a diode D2 is added. In this embodiment, an anode of the diode D2 is connected to the cathode of the diode D1. A cathode of the diode D2 is connected to the node C between the resistor R4 and the resistor R5. The working process of the overcurrent protection circuit 300 is similar to the working process of the overcurrent protection circuit 100, therefore the working process of the overcurrent protection circuit 300 is not described here.

Figure 4:
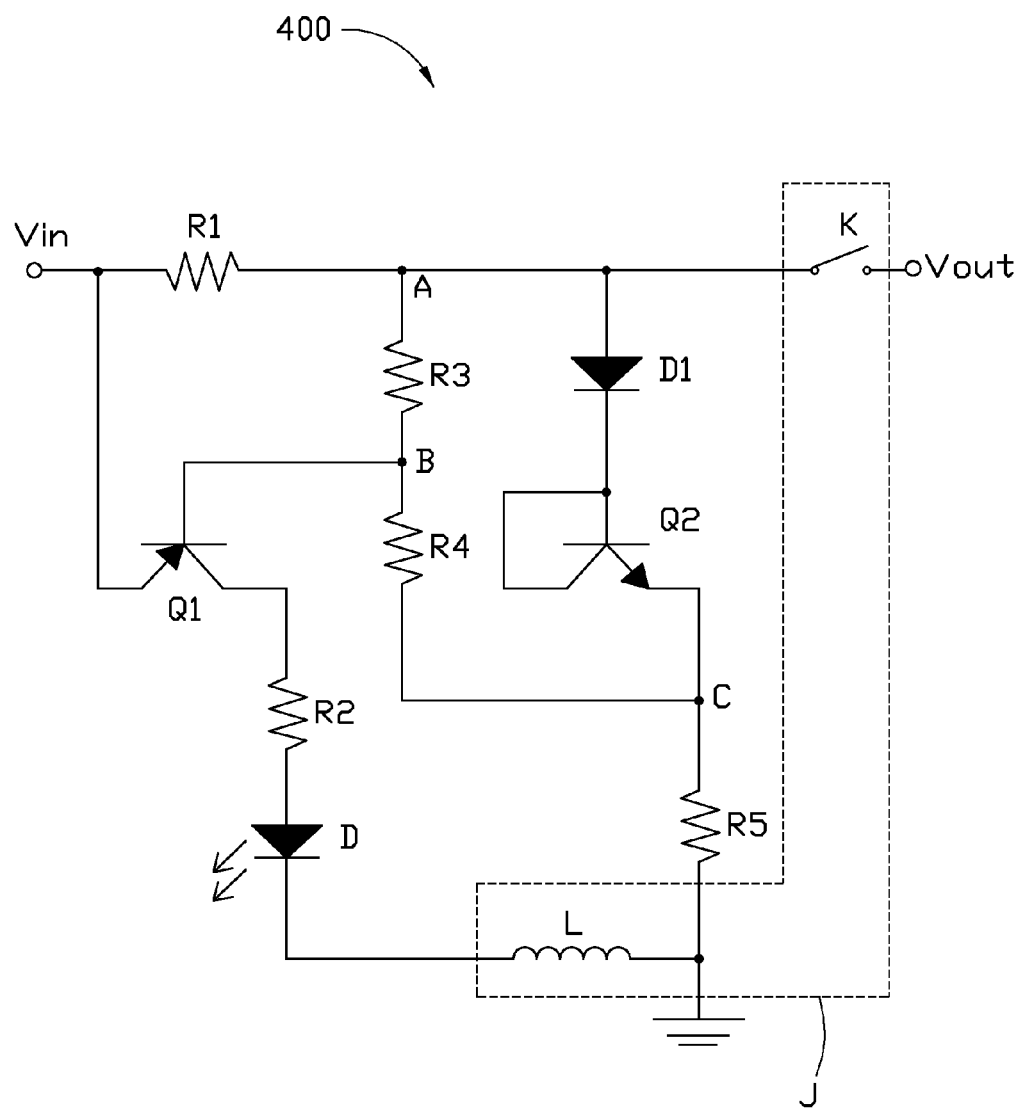
FIG. 4 is a circuit diagram of a fourth exemplary embodiment of an overcurrent protection circuit.

Referring to FIG. 4, a fourth exemplary embodiment of an overcurrent protection circuit 400 is shown. The overcurrent protection circuit 400 is similar to the overcurrent protection circuit 100, except that an npn transistor Q2 is added. In this embodiment, a base of the transistor Q2 is connected the cathode D1 and a collector of the transistor Q2. An emitter of the transistor Q2 is connected to the node C between the resistor R4 and the resistor R5. The working process of the overcurrent protection circuit 400 is similar to the working process of the overcurrent protection circuit 100, therefore the working process of the overcurrent protection circuit 400 is not described here.

In other embodiments, the diode D1, the diode D2, the transistor Q2 can be adjusted according to requirements, and can be replaced by other types of break-over elements having break-over voltages according to requirements. The LED D or the buzzer S can be replaced by other types of alarm elements or omitted to save costs.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An overcurrent protection circuit connected between a voltage input and a voltage output of an electronic device to protect against excessive current between the voltage input and the voltage output, the overcurrent protection circuit comprising:

a relay comprising a coil and a normally closed switch, wherein the switch is opened in response to the coil being powered on, wherein a first terminal of the switch is connected to the voltage input via a first resistor, a second terminal of the switch is connected to the voltage output;

an pnp transistor, wherein an emitter of the pnp transistor is connected to the voltage input, a collector of the pnp transistor is connected to a first terminal of the coil via a second resistor, a second terminal of the coil is grounded, a series circuit including a third, a fourth, and a fifth resistors in series is connected between the first terminal of the switch and ground, a base of the pnp transistor is connected to a node between the third resistor and the fourth resistor; and a break-over element having a break-over voltage, wherein a first terminal of the break-over element is connected to the first terminal of the switch, a second terminal of the break-over element is connected to a node between the fourth resistor and the fifth resistor.

2. The overcurrent protection circuit of claim 1, further comprising an alarm element connected between the second resistor and the coil.

3. The overcurrent protection circuit of claim 2, wherein the alarm element is a light-emitting diode or a buzzer.

4. The overcurrent protection circuit of claim 1, wherein the break-over element comprises a diode, an anode of the diode is connected to the first terminal of the switch, a cathode of the diode is connected to the node between the fourth resistor and the fifth resistor.

5. The overcurrent protection circuit of claim 1, wherein the break-over element comprises an npn transistor, a base of the npn transistor is connected to the first terminal of the switch and a collector of the npn transistor, an emitter of the npn transistor is connected to the node between the fourth resistor and the fifth resistor.

6. The overcurrent protection circuit of claim 1, wherein the break-over element comprises a first diode and a second diode, an anode of the first diode is connected to first terminal of the switch, a cathode of the first diode is connected to an anode of the second diode, a cathode of the second diode is connected to the node between the fourth resistor and the fifth resistor.

7. The overcurrent protection circuit of claim 1, wherein the break-over element comprises a diode and an npn transistor, an anode of the diode is connected to the first terminal of the switch, a cathode of the diode is connected to a base and a collector of the npn transistor, an emitter of the npn transistor is connected to the node between the fourth resistor and the fifth resistor.

* * * * *